United States Patent
Kim et al.

(10) Patent No.: US 12,308,930 B2
(45) Date of Patent: May 20, 2025

(54) METHOD AND APPARATUS FOR SIGNAL RECEPTION IN COMMUNICATION SYSTEM

(71) Applicant: ELECTRONICS AND TELECOMMUNICATIONS RESEARCH INSTITUTE, Daejeon (KR)

(72) Inventors: Chung Sup Kim, Daejeon (KR); Hyuk Je Kim, Daejeon (KR); Kwan Woong Ryu, Daejeon (KR); Sung Woong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 78 days.

(21) Appl. No.: 18/369,973

(22) Filed: Sep. 19, 2023

(65) Prior Publication Data

US 2024/0214053 A1    Jun. 27, 2024

(30) Foreign Application Priority Data

Dec. 23, 2022 (KR) .................. 10-2022-0183636

(51) Int. Cl.
*H04B 7/08* (2006.01)
*H04B 1/10* (2006.01)

(52) U.S. Cl.
CPC ............. *H04B 7/0808* (2013.01); *H04B 1/10* (2013.01)

(58) Field of Classification Search
CPC ...... H04B 7/0617; H04B 1/10; H04B 7/0808; G01S 5/0215
See application file for complete search history.

(56) References Cited

U.S. PATENT DOCUMENTS 7,342,535 B2    3/2008  Ann et al.
8,086,178 B2   12/2011  Sun et al.
(Continued)

FOREIGN PATENT DOCUMENTS

KR    10-0734347 B1    7/2007

OTHER PUBLICATIONS

Hussain Elkotby and Mai Vu, "A probabilistic interference distribution model encompassing cellular LOS and NLOS mmWave propagation", IEEE Global Conference on Signal and Information Processing (GlobalSIP), 2016 (Year: 2016).*

(Continued)

*Primary Examiner* — Aristocratis Fotakis
(74) *Attorney, Agent, or Firm* — LRK PATENT LAW FIRM

(57) ABSTRACT

An operation method of a first communication node in a communication system may include: determining whether each of one or more interference signals satisfies an LOS condition or an NLOS condition, the one or more interference signals being received through a first antenna composed of a plurality of antenna elements; estimating incident direction(s) of the one or more interference signals; performing spatial filtering based on the incident direction(s) of the one or more interference signals, with respect to each of a plurality of array antenna combinations each of which is determined at least in part based on some of the plurality of antenna elements; and receiving wireless signals based on a result of the spatial filtering.

12 Claims, 5 Drawing Sheets

(56) References Cited

U.S. PATENT DOCUMENTS

| | | | |
|---|---|---|---|
| 9,008,222 B2 | 4/2015 | Stirling-Gallacher et al. | |
| 9,509,478 B2 | 11/2016 | Montojo et al. | |
| 9,813,123 B2 | 11/2017 | Nam et al. | |
| 2012/0162004 A1 | 6/2012 | Kim et al. | |
| 2014/0369449 A1* | 12/2014 | Shah | H04B 7/0854 375/345 |
| 2019/0369204 A1* | 12/2019 | Kim | G01S 13/46 |
| 2023/0111603 A1* | 4/2023 | Ghimire | H04B 7/0421 455/456.1 |

OTHER PUBLICATIONS

Pengfei Lyu, "Numerical and Experimental Indoor Channel Analysis for LOS-NLOS Identification at 60 GHz", Sorbonne Université, Thesis, Oct. 21, 2021 (Year: 2021).*

* cited by examiner

METHOD AND APPARATUS FOR SIGNAL RECEPTION IN COMMUNICATION SYSTEM

CROSS-REFERENCE TO RELATED APPLICATION

This application claims priority to Korean Patent Application No. 10-2022-0183636, filed on Dec. 23, 2022, with the Korean Intellectual Property Office (KIPO), the entire contents of which are hereby incorporated by reference.

BACKGROUND

1. Technical Field

Exemplary embodiments of the present disclosure relate to a signal reception technique in a communication system, and more specifically, to a technique for reducing interference signals in a communication system using an array antenna.

2. Description of Related Art

With the development of information and communication technology, various wireless communication technologies are being developed. Representative wireless communication technologies include long term evolution (LTE) and new radio (NR) defined as the 3rd generation partnership project (3GPP) standards. The LTE may be one of 4th generation (4G) wireless communication technologies, and the NR may be one of 5th generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

An exemplary embodiment of a communication system may support signal transmission and reception based on a multi-input multi-output (MIMO) antenna, array antenna, or the like. When transmitting and receiving nodes transmit and receive wireless signals in the communication system, if heterogeneous services or interference signals appear in the same or adjacent time-frequency resources, the performance and efficiency of communication services between the transmitting and receiving nodes may deteriorate. For example, the stronger the power of the interference signals, the greater the performance of communication services may deteriorate. In order to prevent such the performance degradation of communication services in a crowded radio wave environment where heterogeneous wireless devices coexist, techniques for efficiently reducing interference signals may be required.

Matters described as the prior arts are prepared to help understanding of the background of the present disclosure, and may include matters that are not already known to those of ordinary skill in the technology domain to which exemplary embodiments of the present disclosure belong.

SUMMARY

Exemplary embodiments of the present disclosure are directed to providing a signal receiving method and apparatus for data efficiency improvement, in which a receiving node receiving radio signals recognizes characteristics of interference signal sources and reduces effects of interference signals.

According to a first exemplary embodiment of the present disclosure, an operation method of a first communication node in a communication system may comprise: determining whether each of one or more interference signals satisfies a line-of-sight (LOS) condition or a non-line-of-sight (NLOS) condition, the one or more interference signals being received through a first antenna composed of a plurality of antenna elements; estimating incident direction(s) of the one or more interference signals; performing spatial filtering based on the incident direction(s) of the one or more interference signals, with respect to each of a plurality of array antenna combinations each of which is determined at least in part based on some of the plurality of antenna elements; and receiving wireless signals based on a result of the spatial filtering, wherein incident direction(s) of NLOS interference signal(s) corresponding to the NLOS condition among the one or more interference signals may be estimated based on p largest eigenvalue vectors and q smallest eigenvalue vectors among a plurality of eigenvalue vectors obtained based on a first direction finding (DF) algorithm, p and q being natural numbers.

The estimating may comprise: obtaining the plurality of eigenvalue vectors by performing operations based on the first DF algorithm for interference signal(s) corresponding to the NLOS condition; identifying m largest eigenvalue vectors and n smallest eigenvalue vectors among the obtained plurality of eigenvalue vectors; estimating a noise sub-space based on the n smallest eigenvalue vectors; and estimating the incident direction(s) of NLOS interference signal(s) corresponding to the m largest eigenvalue vectors, based on the estimated noise sub-space.

The estimating may comprise: obtaining a first matrix by performing operations based on a second DF algorithm for a first LOS interference signal corresponding to the LOS condition; and obtaining a first direction vector corresponding to an incident direction of the first LOS interference signal based on one element with a largest size among a plurality of elements constituting the first matrix.

Each of the plurality of array antenna combinations may be configured to include K antenna elements randomly selected from among the plurality of antenna elements, K being a natural number greater than 1.

Each of the plurality of array antenna combinations may commonly include a first reference antenna element selected from among the plurality of antenna elements and may include (K−1) antenna element(s) randomly selected from among remaining antenna elements excluding the first antenna element from the plurality of antenna elements, K being a natural number greater than 1.

The performing of the spatial filtering may comprise: determining a plurality of spatial filters respectively corresponding to the plurality of array antenna combinations, based on the estimated incident direction(s) of the one or more interference signals; and performing the spatial filtering based on the plurality of spatial filters on signals received through the plurality of array antenna combinations, respectively, wherein the plurality of spatial filters are configured to perform filtering in different schemes for the incident direction(s) of NLOS interference signal(s) and incident direction(s) of LOS interference signal(s) corresponding to the LOS condition.

The plurality of spatial filters may be configured to perform a minimum variance distortion-less response (MVDR) filtering for the incident direction(s) of the NLOS interference signal(s), and perform a general sidelobe canceller (GSC) filtering for the incident direction(s) of the LOS interference signal(s).

According to a second exemplary embodiment of the present disclosure, a first communication node in a communication system may comprise a processor, and the processor may cause the first communication node to perform: determining whether each of one or more interference signals satisfies a line-of-sight (LOS) condition or a non-line-of-sight (NLOS) condition, the one or more interference signals being received through a first antenna composed of a plurality of antenna elements; estimating incident direction(s) of the one or more interference signals; performing spatial filtering based on the incident direction(s) of the one or more interference signals, with respect to each of a plurality of array antenna combinations each of which is determined at least in part based on some of the plurality of antenna elements; and receiving wireless signals based on a result of the spatial filtering, wherein incident direction(s) of NLOS interference signal(s) corresponding to the NLOS condition among the one or more interference signals are estimated based on p largest eigenvalue vectors and q smallest eigenvalue vectors among a plurality of eigenvalue vectors obtained based on a first direction finding (DF) algorithm, p and q being natural numbers.

In the estimating, the processor may further cause the first communication node to perform: obtaining the plurality of eigenvalue vectors by performing operations based on the first DF algorithm for interference signal(s) corresponding to the NLOS condition; identifying m largest eigenvalue vectors and n smallest eigenvalue vectors among the obtained plurality of eigenvalue vectors; estimating a noise sub-space based on the n smallest eigenvalue vectors; and estimating the incident direction(s) of NLOS interference signal(s) corresponding to the m largest eigenvalue vectors, based on the estimated noise sub-space.

Each of the plurality of array antenna combinations may be configured to include K antenna elements randomly selected from among the plurality of antenna elements, K being a natural number greater than 1.

Each of the plurality of array antenna combinations may commonly include a first reference antenna element selected from among the plurality of antenna elements and may include (K−1) antenna element(s) randomly selected from among remaining antenna elements excluding the first antenna element from the plurality of antenna elements, K being a natural number greater than 1.

In the performing of the spatial filtering, the processor may further cause the first communication node to perform: determining a plurality of spatial filters respectively corresponding to the plurality of array antenna combinations, based on the estimated incident direction(s) of the one or more interference signals; and performing the spatial filtering based on the plurality of spatial filters on signals received through the plurality of array antenna combinations, respectively, wherein the plurality of spatial filters are configured to perform filtering in different schemes for the incident direction(s) of NLOS interference signal(s) and incident direction(s) of LOS interference signal(s) corresponding to the LOS condition.

According to the exemplary embodiments of the method and apparatus for receiving signals in the communication system, a communication node including antenna(s) (e.g., array antenna) supporting a MIMO scheme may estimate incident directions of interference signals received under an LOS condition and incident directions of interference signals received under an NLOS condition. The communication node may determine a plurality of array antenna combinations based on a plurality of antenna elements constituting the antenna(s), and may perform spatial filtering on each of the plurality of array antenna combinations. Through this, signals received from directions estimated to be the incident directions of the interference signals can be reduced at the antenna(s) of the communication node. Accordingly, signal reception quality at the antenna(s) in all directions other than the incident directions of the interference signals can be improved.

DETAILED DESCRIPTION OF THE EMBODIMENTS

Figure 1:
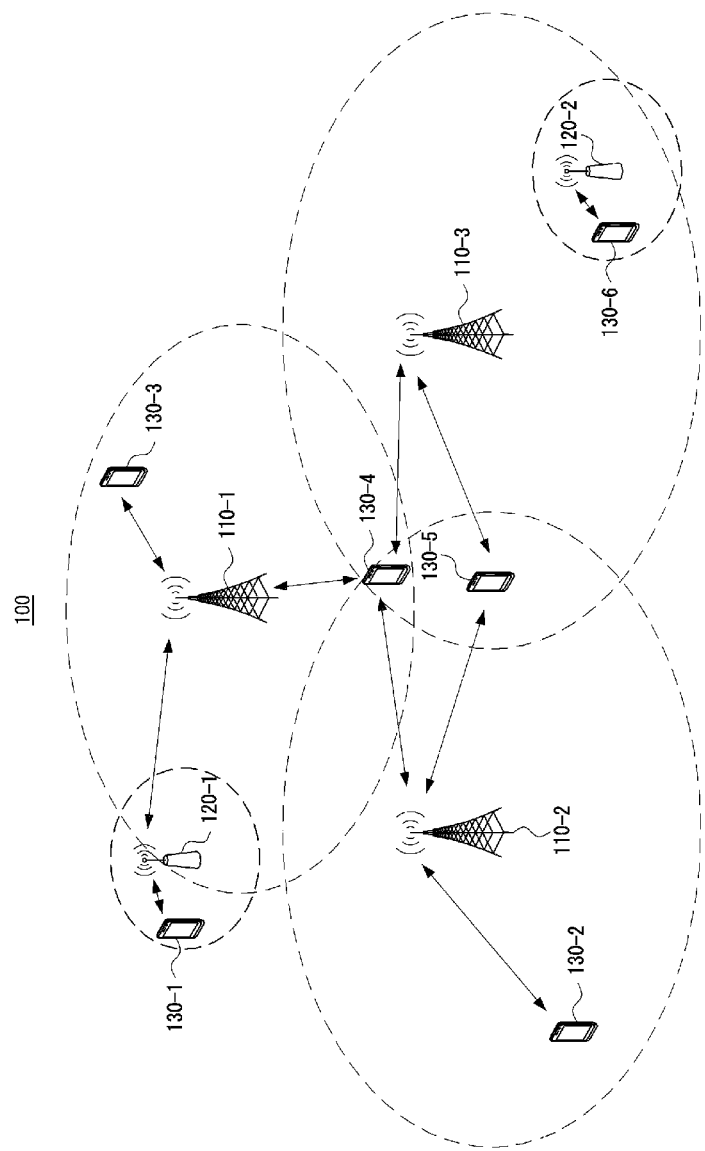
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
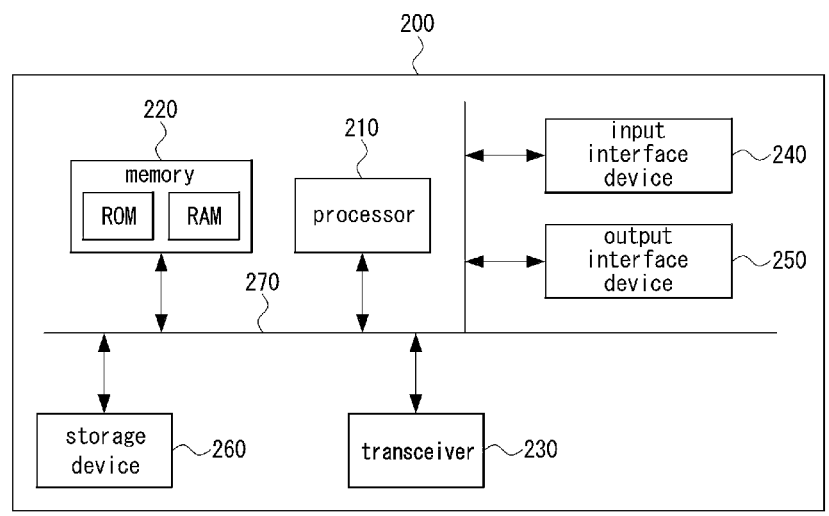
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, apparatus (e.g., a mounted an Internet of things (IoT) device, a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for receiving signals in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
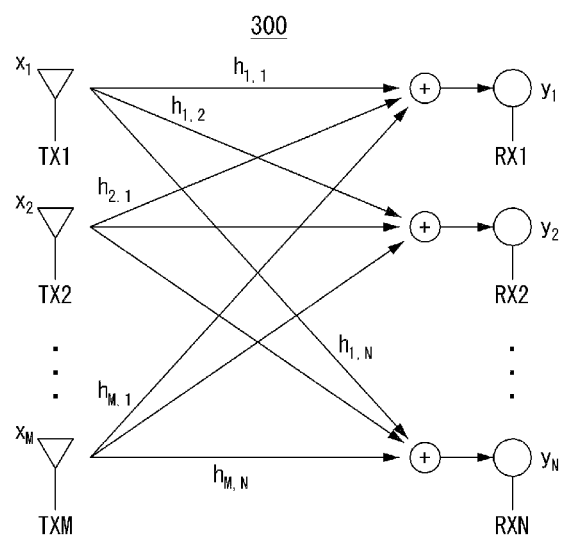
FIG. 3 is a conceptual diagram for describing an exemplary embodiment of a communication system in which one or more interference sources exist.

FIG. 3 is a conceptual diagram for describing an exemplary embodiment of a communication system in which one or more interference sources exist.

Referring to FIG. 3, a communication system 300 may include one or more transmitting ends TX1, TX2, ..., and TXM and one or more receiving ends RX1, RX2, ..., and RXN. The number M of one or more transmitting ends TX1, TX2, ..., and TXM and the number N of one or more receiving ends RX1, RX2, ..., and RXN may be natural numbers of 1 or more. M and N may be equal to or different from each other. The communication system 300 may be configured identically or similarly to the communication system described with reference to FIG. 1. Hereinafter, in describing an exemplary embodiment of the communication system in which one or more interference sources exist with reference to FIG. 3, description redundant with those described with reference to FIGS. 1 and 2 may be omitted.

In an exemplary embodiment of the communication system 300, the one or more transmitting ends TX1, TX2, ..., and TXM and the one or more receiving ends RX1, RX2, ..., and RXN may be configured identically or similarly to some of the communication nodes described with reference to FIG. 1. Each of the one or more transmitting ends TX1, TX2, ..., and TXM and the one or more receiving ends RX1, RX2, ..., and RXN may be configured identically or similarly to the communication node 200 described with reference to FIG. 2.

In an exemplary embodiment of the communication system 300, the one or more transmitting ends TX1, TX2, ..., and TXM and the one or more receiving ends RX1, RX2, ..., and RXN may correspond to one or more antennas included in one or more communication nodes or one or more antenna elements constituting one or more antennas.

In an exemplary embodiment of the communication system 300, a portion of the one or more transmitting ends TX1, TX2, ..., and TXM may correspond to one or more transmitting nodes, and another portion thereof may correspond to one or more transmitting antennas or one or more transmitting antenna elements. In an exemplary embodiment of the communication system 300, a portion of the one or more receiving ends RX1, RX2, ..., and RXN may correspond to one or more receiving nodes, and another portion thereof may correspond to one or more receiving antennas or one or more receiving antenna elements.

One or more wireless channels $h_{1,1}$, $h_{1,2}$, ..., $h_{1,N}$, ..., and $h_{M,N}$ may be formed between the one or more transmitting ends TX1, TX2, ..., and TXM and the one or more receiving ends RX1, RX2, ..., and RXN. The one or more transmitting ends TX1, TX2, ..., and TXM may transmit one or more transmission signals $x_1$, $x_2$, ..., and $x_M$ through the one or more wireless channels. The one or more receiving ends RX1, RX2, ..., and RXN may obtain one or more reception signals $y_1$, $y_2$, ..., and $y_N$ based on wireless signals received through the one or more wireless channels.

When the number of transmitting ends TX1, TX2, ..., and TXM and/or the number of receiving ends RX1, RX2, ..., and RXN existing in the communication system 300 are plural (i.e., M and/or N is greater than 1), the plurality of transmitting ends TX1, TX2, ..., and TXM and/or the plurality of receiving ends RX1, RX2, ..., and RXN may mutually act as interference sources. For example, when TX1 desires to transmit a wireless signal to RX1 through the channel $h_{1,1}$, wireless signals received at RX1 from TX2 to TXM through the wireless channels $h_{2,1}$ to $h_{M,1}$ may act as interferences. Here, the reception signal $y_1$ at RX1 may be expressed as in Equation 1 below.

$$y_1 = h_{1,1}x_1 + h_{2,1}x_2 + \ldots h_{M,1}x_M + n_1 \qquad \text{[Equation 1]}$$

In Equation 1, $n_1$ may refer to a noise component that may occur during a reception process of RX1. The reception signal $y_1$ at RX1 may be considered as a sum of a result of receiving the transmission signals $x_1$, $x_2$, ..., and $x_M$ of the transmitting ends TX1, TX2, ..., and TXM through the corresponding wireless channels $h_{1,1}$, $h_{2,1}$, ..., and $h_{M,1}$ and the noise component $n_1$. In other words, an interference phenomenon may occur due to communication between the plurality of transmitting ends and the plurality of receiving ends. Due to the interference phenomenon, a problem in which a transmission rate between each transmitting end and each receiving end in the communication system is lowered, a problem in which a signal transmitted from a transmitting end is not properly received at a receiving end, a problem in which a signal not transmitted from a transmitting end may appear to be received at a receiving end, or the like may occur.

Figure 4:
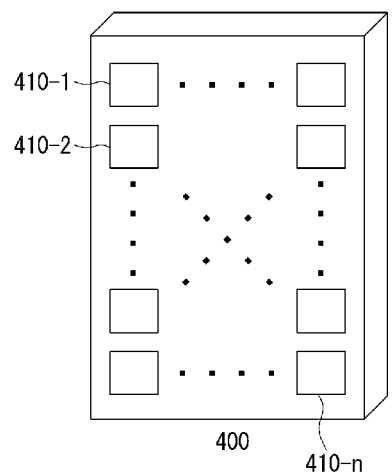
FIG. 4 is a conceptual diagram for describing an exemplary embodiment of an antenna structure in a communication system.

FIG. 4 is a conceptual diagram for describing an exemplary embodiment of an antenna structure in a communication system.

Referring to FIG. 4, a first communication node of the communication system may include one or more antennas. Here, the first communication node may be configured identically or similarly to the communication node described with reference to FIG. 1 and/or FIG. 2. The first communication node may transmit or receive wireless signals. Alternatively, the first communication node may perform both transmission and reception of wireless signals. Hereinafter, in describing an exemplary embodiment of the antenna structure in the communication system with reference to FIG. 4, description redundant with those described with reference to FIGS. 1 to 3 may be omitted.

In an exemplary embodiment of the communication system, the first communication node may include a first antenna 400. The first antenna 400 may be an antenna that supports MIMO communication. Alternatively, the first antenna 400 may correspond to an array antenna composed of a plurality of antenna elements forming a predetermined array.

The first antenna 400, which corresponds to an array antenna, may be composed of a plurality of antenna elements 410-1, 410-2, ..., 410-n. The plurality of antenna elements 410-1, 410-2, ..., and 410-n constituting the first antenna 400 may be referred to as 'antennas', 'antenna elements', 'array elements', or the like.

When the first antenna 400 corresponds to a transmitting antenna, the plurality of antenna elements 410-1, 410-2, ..., and 410-n may correspond to the one or more transmitting ends TX1, TX2, ..., and TXM. When the first antenna 400 corresponds to a receiving antenna, the plurality of antenna elements 410-1, 410-2, ..., and 410-n may correspond to the one or more receiving ends RX1, RX2, ..., and RXN.

Meanwhile, at least some of the plurality of antenna elements 410-1, 410-2, ..., and 410-n constituting the first antenna 400 may act as transmitting end(s) and receiving end(s) at the same time. In other words, at least some of the plurality of antenna elements 410-1, 410-2, ..., and 410-n constituting the first antenna 400 may perform both transmission and reception of wireless signals.

Meanwhile, in an exemplary embodiment of the communication system, the first antenna 400 may configure an array together with other antenna(s) identical or similar to the first antenna 400 to form a separate array antenna (not shown). In the separate array antenna, the first antenna 400 may be a transmitting antenna, a receiving antenna, or an antenna that performs both transmission and reception.

In an exemplary embodiment of the communication system, an array antenna may be comprised of a plurality of antenna elements (or a plurality of antennas). The plurality of antenna elements constituting the array antenna may be arranged in a row. Alternatively, the plurality of antenna elements constituting the array antenna may be arranged in a grid structure or a square array structure. However, this is merely an example for convenience of description, and exemplary embodiments of the antenna structure in the communication system are not limited thereto.

Figure 5:
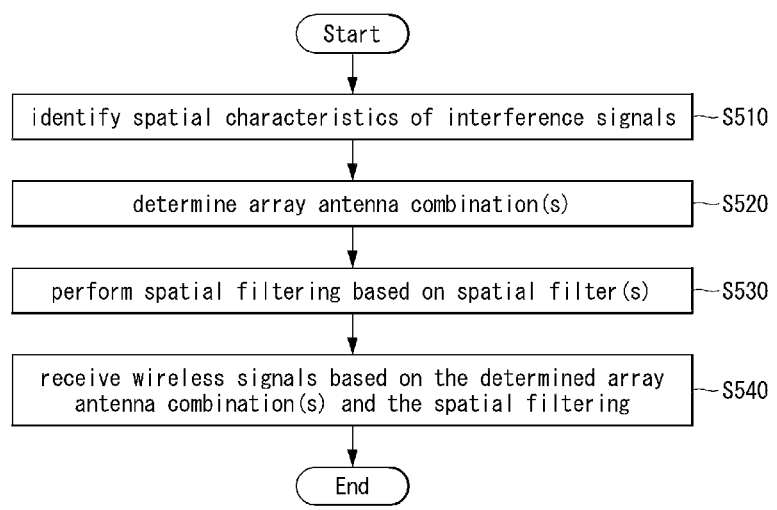
FIG. 5 is a flowchart for describing a first exemplary embodiment of a signal reception method in a communication system.

FIG. 5 is a flowchart for describing a first exemplary embodiment of a signal reception method in a communication system.

Referring to FIG. 5, the communication system may include a plurality of communication nodes. The communication system may be configured identically or similarly to the communication system 300 described with reference to FIG. 3. At least some of the plurality of communication nodes constituting the communication system may include antenna(s) (e.g., the first antenna) according to the exemplary embodiment of the antenna described with reference to FIG. 4. According to the first exemplary embodiment of the signal reception method in the communication system, a first communication node in the communication system may perform operations for receiving wireless signals while reducing the effect of interference. Hereinafter, in describing the first exemplary embodiment of the signal reception method in the communication system with reference to FIG. 5, description redundant with those described with reference to FIGS. 1 to 4 may be omitted.

In an exemplary embodiment of the communication system, the first communication node may receive one or more wireless signals transmitted from one or more transmitting ends present in the communication system. Here, each of the one or more transmitting ends may correspond to a transmitting node or a transmitting antenna (or transmitting antenna element).

In an exemplary embodiment of the communication system, there may be a plurality of transmitting ends in the communication system. One or more transmitting ends among the plurality of transmitting ends may transmit one or more target signals. Here, each of the one or more target signals may correspond to a wireless signal to be received by the first communication node. For example, the one or more target signals may correspond to wireless signals that one or more transmitting ends want to transmit to the first communication node. The one or more target signals may correspond to wireless signals that one or more transmitting ends want to transmit to one or more communication nodes existing within a predetermined communication region based on a multicast or broadcast scheme. Alternatively, the one or more target signals may correspond to wireless signals that the first communication node wants to receive from one or more transmitting ends.

The first communication node may receive a plurality of wireless signals transmitted from a plurality of transmitting ends. Among the plurality of wireless signals received by the first communication node, each of the remaining wireless signals excluding the one or more target signals may correspond to an interference signal. That is, the plurality of wireless signals received by the first communication node may be classified into the one or more target signals and one or more interference signals. In an exemplary embodiment of the communication system, when an interference signal occurs in the same time-frequency band as a target signal and thus a user communication service performance deteriorates, a power of the interference signal may have a magnitude of −10 dB or more compared to a power of the target signal. The first communication node may perform operations to reduce the influence of one or more interference signals among wireless signals transmitted from the plurality of transmitting ends and increase reception performance of the one or more target signals.

In an exemplary embodiment of the communication system, the first communication node may perform an interference recognition procedure (S510). In the step S510, the first communication node may recognize or identify spatial characteristics of one or more interference signals. For example, the first communication node may perform an operation to estimate an incident direction, which is a spatial characteristic of each of the one or more interference signals. The operation in the step S510 will be described in more detail below with reference to FIG. 6.

Figure 6:
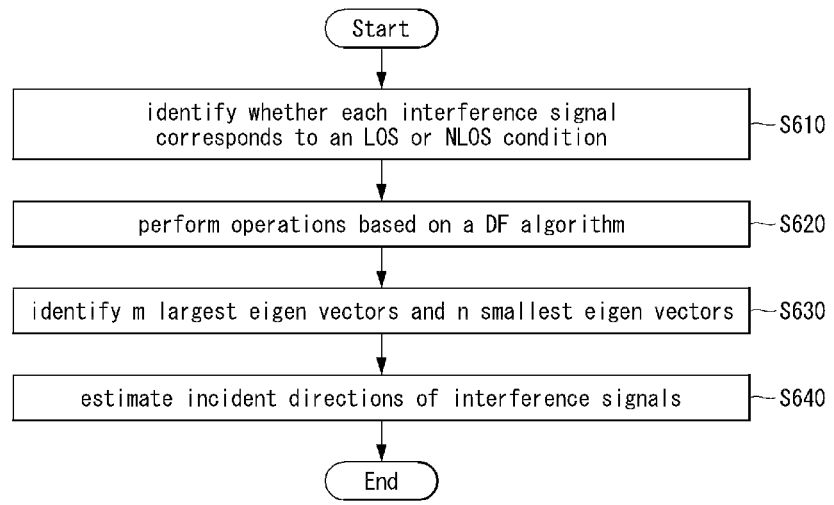
FIG. 6 is a flowchart for describing a second exemplary embodiment of a signal reception method in a communication system.

FIG. 6 is a flowchart for describing a second exemplary embodiment of a signal reception method in a communication system.

Referring to FIG. 6, the communication system may be configured identically or similarly to the communication system described with reference to FIG. 5. A first communication node included in the communication system may be configured identically or similarly to the communication node described with reference to FIG. 5. According to the second exemplary embodiment of the signal reception method in the communication system, the first communication node may perform an interference recognition procedure to recognize spatial characteristics of one or more interference signals. Hereinafter, in describing the second exemplary embodiment of the signal reception method in the communication system with reference to FIG. 6, description redundant with those described with reference to FIGS. 1 to 5 may be omitted.

In an exemplary embodiment of the communication system, the first communication node may perform an interference recognition procedure. Here, the interference recognition procedure may be the same as or similar to the step S510 described with reference to FIG. 5. In the interference recognition procedure, the first communication node may recognize or identify an incident direction, which is a spatial characteristic of each of one or more interference signals.

Specifically, the first communication node may identify whether each of the one or more interference signals received is a line-of-sight (LOS) interference signal or a non-LOS (NLOS) interference signal, in the interference recognition procedure (S610). In other words, the first communication node may distinguish the one or more received interference signals into LOS interference signals (or components) and NLOS interference signals (or components). The first communication node may perform operations based on a direction finding (DF) algorithm for each of the one or more interference signals for which it has been identified whether each of them is an LOS or NLOS interference signal (S620). Here, the DF algorithm may correspond to a singular value decomposition (SVD) algorithm, an eigenvalue decomposition (EVD) algorithm, a multiple signal classification (MUSIC) algorithm, and/or the like.

For example, the first communication node may perform an SVD algorithm-based operation on a received signal to find an incident direction of the signal. The SVD algorithm may refer to an operation that calculates or estimates singular value components through an SVD operation for the received signal. The SVD operation may be defined as, for example, Equation 2.

$$D = \begin{bmatrix} X_0 & X_{-1} & \cdots & X_{-L} \\ X_1 & X_0 & \cdots & X_{-L+1} \\ \vdots & \vdots & \ddots & \vdots \\ X_{K-L-1} & X_{K-L-2} & \cdots & X_0 \end{bmatrix} = U \cdot S \cdot V^H \quad \text{[Equation 2]}$$

In Equation 2, D may correspond to a data matrix consisting of (K-L) rows and (N+1) columns. The rank of the data matrix may be (L+1). Here, L may be a natural number greater than N and less than K−N−1. U may correspond to a left singular vector matrix. S may correspond to a singular value diagonal matrix. V may correspond to a right singular vector matrix. The first communication node may obtain the singular value diagonal matrix S by performing an SVD operation such as the equation of Equation 2 on the received signal. The first communication node may obtain a direction vector (or eigenvalue direction vector) corresponding to a direction of the received signal based on elements constituting the singular value diagonal matrix S.

The MUSIC algorithm may refer to an algorithm that performs direction estimation and separation of a plurality of incident signals based on SVD operations or EVD operations. According to the MUSIC algorithm, direction estimation and separation can be performed with super-resolution for a plurality of incident signals received through multiple paths. When a plurality of incident signals are received through multiple paths, the first communication node may obtain a plurality of eigenvalue vectors based on the MUSIC algorithm. At least some of the plurality of eigenvalue vectors may correspond to incident directions of the plurality of received signals, respectively. Here, estimation of a noise sub-space may be required to estimate the incident directions based on the MUSIC algorithm. The incident direction finding based on the MUSIC algorithm may be closely related to an orthogonality between a magnitude of power corresponding to each incident direction and the noise sub-space. If the noise sub-space is not accurately estimated, the incident direction finding performance based on the MUSIC algorithm may be degraded.

In the step S620, the first communication node may perform the SVD operation on one or more LOS interference signals to obtain a singular value diagonal matrix SL. The first communication node may obtain one direction vector for an LOS interference signal based on one component with the largest size among a plurality of singular value elements constituting the obtained singular value diagonal matrix SL. Since an LOS interference signal is received under the LOS condition, it may mainly be received through a direct path. Accordingly, the first communication node may identify (or estimate) an incident direction of an LOS interference signal based on one direction vector obtained for the LOS interference signal (S640).

Meanwhile, in the step S620, the first communication node may perform a MUSIC algorithm-based operation on one or more NLOS interference signals to obtain a plurality of eigenvalue vectors. The one or more NLOS interference signals may be received through multiple paths rather than a single path. For example, since a first NLOS interference signal is received under the NLOS condition, it may not be received through a direct path, but may be received through multiple paths after being reflected in a communication environment. Assuming that the number of the multiple paths is greater than the number of antenna elements constituting the array antenna included in the first communication node, the first communication node may perform the incident direction finding for the one or more NLOS interference signals based on one or more eigenvalue vectors having the largest size(s) and one or mor eigenvalue vectors having the smallest size(s) among the plurality of eigenvalue vectors obtained based on the MUSIC algorithm.

Specifically, the first communication node may identify p largest eigenvalue vectors and q smallest eigenvalue vectors based on size(s) among the plurality of eigenvalue vectors obtained in the step S620 (S630). Here, p and q may be natural numbers of 1 or more. Among the received components of the NLOS interference signals received through multiple paths, a path corresponding to a component with the largest received power may have a high probability of corresponding to the eigenvalue vectors having the largest size(s). For example, in an exemplary embodiment of the communication system, among the received components of the NLOS interference signal received through multiple paths, the path corresponding to the component with the largest received power corresponds to any one of the three largest eigenvalue vectors with a very high probability.

In an exemplary embodiment of the communication system, the first communication node may identify three eigenvalue vectors having the largest size(s) and five eigenvalue vectors having the smallest size(s) among the plurality of eigenvalue vectors obtained in the step S620. That is, in the step S630, p may be 3 and q may be 5, but this is merely an example for convenience of description, and the second exemplary embodiment of the signal reception method in the communication system is not limited thereto.

The first communication node may consider the smallest q eigenvalue vectors identified in the step S630 to correspond to a noise sub-space. In other words, the first communication node may estimate the noise sub-space based on the smallest q eigenvalue vectors identified in the step S630. The first communication node may estimate the incident directions respectively corresponding to the largest m eigenvalue vectors identified in the step S630, based on the noise sub-space estimated based on the smallest q eigenvalue vectors (S640).

Based on the operations according to the steps S610 to S640, the first communication node may estimate the incident directions of interference signals received under the LOS condition or the NLOS condition.

Referring again to FIG. 5, the first communication node may determine a plurality of array antenna combinations by combining at least some of the plurality of antenna elements constituting the first antenna (e.g., array antenna) included in the first communication node (S520). Here, each of the plurality of array antenna combinations may be composed of a combination of some of the plurality of antenna elements constituting the first antenna. The operations in the step S520 will be described in more detail below with reference to FIG. 7.

Figure 7:
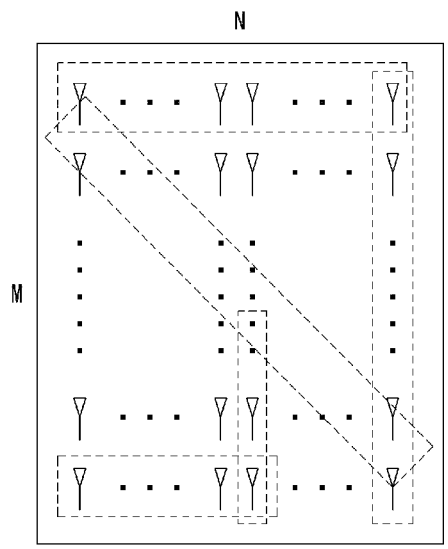
FIG. 7 is a conceptual diagram for describing a third exemplary embodiment of a signal reception method in a communication system.

FIG. 7 is a conceptual diagram for describing a third exemplary embodiment of a signal reception method in a communication system.

Referring to FIG. 7, the communication system may be configured identically or similarly to the communication system described with reference to FIG. 5. A first communication node included in the communication system may be configured identically or similarly to the communication node described with reference to FIG. 5. According to the third exemplary embodiment of the signal reception method in the communication system, the first communication node may determine a plurality of array antenna combinations based on a plurality of antenna elements constituting a first antenna included in the first communication node. Hereinafter, in describing the third exemplary embodiment of the signal reception method in the communication system with reference to FIG. 7, description redundant with those described with reference to FIGS. 1 to 6 may be omitted.

The first communication node may include the first antenna. The first antenna may be composed of a plurality of antenna elements. The plurality of antenna elements constituting the first antenna may be arranged in, for example, an M×N grid structure. Here, M and N may be natural numbers greater than 1. M and N may have the same value or different values. In this case, the first antenna may be composed of M×N antenna elements forming the M×N grid structure. For example, M and N may have values of 4 or 8, respectively, and M×N may have a value of 32 or 64. However, this is merely an example for convenience of description, and the third exemplary embodiment of the signal reception method in the communication system is not limited thereto. The first communication node may determine the plurality of array antenna combinations based on at least some of the M×N antenna elements constituting the first antenna.

In an exemplary embodiment of the communication system, the smaller a correlation value between antenna elements constituting each array antenna combination, the better communication performance in wireless signal reception and incident direction finding can be maintained. The first communication node may determine K array antenna combinations by randomly selecting R antenna elements from among the M×N antenna elements constituting the first antenna. Here, R and K may each be natural numbers greater than 1. R may be the same value as or a different value from M or N. In an exemplary embodiment of the communication system, the first communication node may determine 8 (or 16) array antenna combinations based on 32 (or 64) antenna elements constituting the first antenna, and each array antenna combination may include 8 randomly selected antenna elements. That is, R may be 8, and K may be 8 (or 16).

The first communication node may calculate an array-manifold value for each of the determined K array antenna combinations. Here, in order to reduce the amount of calculation of the array-manifold value, the first communication node may configure the K array antenna combinations so that the K array antenna combinations share one or more reference antenna elements. For example, the first communication node may configure the K array antenna combinations so that each of the K array antenna combinations includes one first reference antenna element and (R−1) randomly selected antenna elements. In other words, when configuring each array antenna combination, the first communication node may randomly select (R−1) antenna elements from the (M×N−1) antenna elements excluding the first reference antenna element among the M×N antenna elements. The first communication node may determine each array antenna combination based on the (R−1) randomly extracted antenna elements and the first reference antenna element. Here, the first reference antenna element may be selected as one antenna element relatively close to the center among the M×N antenna elements constituting the first antenna. The first to K-th array antenna combinations may be referred to as 'first to K-th combinations'. Each of the first to K-th array antenna combinations may include the same first reference antenna element and may further include (R−1) antenna elements, at least some of which are different from those of other array antenna combinations.

Referring again to FIG. 5, the first communication node may perform filtering based on spatial filter(s) (or spatial filter combination(s)) based on the spatial characteristics of the interference signals identified in the step S510 and the plurality of array antenna combinations determined in the step S520 (S530). The operations in the step S530 will be described in more detail below with reference to FIG. 8.

Figure 8:
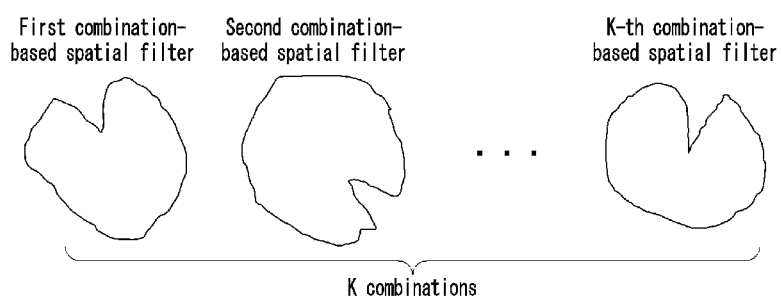
FIG. 8 is a conceptual diagram for describing a fourth exemplary embodiment of a signal reception method in a communication system.

FIG. 8 is a conceptual diagram for describing a fourth exemplary embodiment of a signal reception method in a communication system.

Referring to FIG. 8, the communication system may be configured identically or similarly to the communication system described with reference to FIG. 5. A first communication node included in the communication system may be configured identically or similarly to the communication node described with reference to FIG. 5. According to the fourth exemplary embodiment of the signal reception method in the communication system, the first communication node may perform filtering based on spatial filter(s) (or spatial filter combination(s)) based on a plurality of array antenna combinations. Hereinafter, in describing the fourth exemplary embodiment of the signal reception method in the communication system with reference to FIG. 8, description redundant with those described with reference to FIGS. 1 to 7 may be omitted.

The first communication node determine K array antenna combinations based on M×N antenna elements constituting the first antenna, as in the step S520 described with reference to FIG. 5 or as in the third exemplary embodiment of the signal reception method in the communication system described with reference to FIG. 7. The K array antenna combinations may be referred to as 'first to K-th array antenna combinations', or 'first to K-th combinations'.

The first communication node may determine a spatial filter (or spatial filter combination) based on each of the first to K-th combinations. For example, the first communication node may determine each spatial filter for a specific direction based on each array antenna combination. The first communication node may determine a first spatial filter based on the first combination, a second spatial filter based on the second combination, and a K-th spatial filter based on the K-th combination. The first spatial filter to the K-th spatial filter may be configured to be used to perform filtering on incident directions of one or more interference signals estimated as in the step S510 described with reference to FIG. 5 or the second exemplary embodiment of the signal reception method in the communication system described with reference to FIG. 6. Here, the spatial filters may be configured to perform a type of filtering so that incident signals in specific directions with respect to the incident directions of the LOS interference signals are removed and a constant gain is maintained in other directions. For example, the spatial filters may be configured to perform a minimum variance distortion-less response (MVDR) filtering with respect to the incident directions of the LOS interference signals. Meanwhile, the spatial filters may be configured to perform a general sidelobe canceller (GSC) filtering on the incident directions of the NLOS interference signals.

Referring again to FIG. 5, the first communication node may receive a wireless signal based on spatial filtering by the plurality of array antenna combinations determined in the step S520 and the spatial filters determined in the step S530

(S540). The first communication node may configure a received result, which is subjected to the spatial filtering performed on each of the plurality of array antenna combinations, into a new input signal for each antenna element.

Based on the operations according to the steps S510 to S540, signals from directions estimated as the incident directions of the interference signals may be reduced from signals received at the first antenna (or each array antenna combination) of the first communication node. Accordingly, the signal reception quality at the first antenna in all directions other than the incident directions of the interference signals can be improved.

The first communication node may include components to perform at least some of the operations shown in FIGS. 5 to 8. For example, the operation according to the step S510 may be performed by an interference recognition unit. The operation according to the step S520 may be performed by a receiving antenna array combination implementation unit. The operation according to the step S530 may be performed by a spatial filter implementation unit. The operation according to the step S540 may be performed by an output implementation and MIMO normal operation identification unit. The components such as the interference recognition unit, receiving antenna array combination implementation unit, spatial filter implementation unit, output implementation and MIMO normal operation identification unit, and/or the like may be implemented as physical unit(s) or as logical unit(s).

According to the exemplary embodiments of the method and apparatus for receiving signals in the communication system, a communication node including antenna(s) (e.g., array antenna) supporting a MIMO scheme may estimate incident directions of interference signals received under an LOS condition and incident directions of interference signals received under an NLOS condition. The communication node may determine a plurality of array antenna combinations based on a plurality of antenna elements constituting the antenna(s), and may perform spatial filtering on each of the plurality of array antenna combinations. Through this, signals received from directions estimated to be the incident directions of the interference signals can be reduced at the antenna(s) of the communication node. Accordingly, signal reception quality at the antenna(s) in all directions other than the incident directions of the interference signals can be improved.

However, the effects that the exemplary embodiments of the signal reception method and apparatus can achieve in the communication system are not limited to those mentioned above. Other effects not mentioned are expected to be clearly understood by those skilled in the art in the technical field to which the present disclosure belongs, based on the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first communication node in a communication system, the operation method comprising:
    determining whether each of one or more interference signals satisfies a line-of-sight (LOS) condition or a non-line-of-sight (NLOS) condition, the one or more interference signals being received through a first antenna composed of a plurality of antenna elements;
    estimating incident direction(s) of the one or more interference signals;
    performing spatial filtering based on the incident direction(s) of the one or more interference signals, with respect to each of a plurality of array antenna combinations each of which is determined at least in part based on some of the plurality of antenna elements; and
    receiving wireless signals based on a result of the spatial filtering,
    wherein incident direction(s) of NLOS interference signal(s) corresponding to the NLOS condition among the one or more interference signals are estimated based on p largest eigenvalue vectors and q smallest eigenvalue vectors among a plurality of eigenvalue vectors obtained based on a first direction finding (DF) algorithm, p and q being natural numbers.

2. The operation method according to claim 1, wherein the estimating comprises:
    obtaining the plurality of eigenvalue vectors by performing operations based on the first DF algorithm for interference signal(s) corresponding to the NLOS condition;
    identifying the p largest eigenvalue vectors and the q smallest eigenvalue vectors among the obtained plurality of eigenvalue vectors;
    estimating a noise sub-space based on the q smallest eigenvalue vectors; and estimating the incident direction(s) of NLOS interference signal(s) corresponding to the p largest eigenvalue vectors, based on the estimated noise sub-space.

3. The operation method according to claim 1, wherein the estimating comprises:
obtaining a first matrix by performing operations based on a second DF algorithm for a first LOS interference signal corresponding to the LOS condition; and
obtaining a first direction vector corresponding to an incident direction of the first LOS interference signal based on one element with a largest size among a plurality of elements constituting the first matrix.

4. The operation method according to claim 1, wherein each of the plurality of array antenna combinations is configured to include K antenna elements randomly selected from among the plurality of antenna elements, K being a natural number greater than 1.

5. The operation method according to claim 1, wherein each of the plurality of array antenna combinations commonly includes a first reference antenna element selected from among the plurality of antenna elements and includes (K−1) antenna element(s) randomly selected from among remaining antenna elements excluding the first antenna element from the plurality of antenna elements, K being a natural number greater than 1.

6. The operation method according to claim 1, wherein the performing of the spatial filtering comprises:
determining a plurality of spatial filters respectively corresponding to the plurality of array antenna combinations, based on the estimated incident direction(s) of the one or more interference signals; and
performing the spatial filtering based on the plurality of spatial filters on signals received through the plurality of array antenna combinations, respectively,
wherein the plurality of spatial filters are configured to perform filtering in different schemes for the incident direction(s) of NLOS interference signal(s) and incident direction(s) of LOS interference signal(s) corresponding to the LOS condition.

7. The operation method according to claim 6, wherein the plurality of spatial filters are configured to perform a minimum variance distortion-less response (MVDR) filtering for the incident direction(s) of the NLOS interference signal(s), and perform a general sidelobe canceller (GSC) filtering for the incident direction(s) of the LOS interference signal(s).

8. A first communication node in a communication system, the first communication node comprising a processor, wherein the processor causes the first communication node to perform:
determining whether each of one or more interference signals satisfies a line-of-sight (LOS) condition or a non-line-of-sight (NLOS) condition, the one or more interference signals being received through a first antenna composed of a plurality of antenna elements;
estimating incident direction(s) of the one or more interference signals;
performing spatial filtering based on the incident direction(s) of the one or more interference signals, with respect to each of a plurality of array antenna combinations each of which is determined at least in part based on some of the plurality of antenna elements; and
receiving wireless signals based on a result of the spatial filtering,
wherein incident direction(s) of NLOS interference signal(s) corresponding to the NLOS condition among the one or more interference signals are estimated based on p largest eigenvalue vectors and q smallest eigenvalue vectors among a plurality of eigenvalue vectors obtained based on a first direction finding (DF) algorithm, p and q being natural numbers.

9. The first communication node according to claim 8, wherein in the estimating, the processor further causes the first communication node to perform:
obtaining the plurality of eigenvalue vectors by performing operations based on the first DF algorithm for interference signal(s) corresponding to the NLOS condition;
identifying the p largest eigenvalue vectors and the q smallest eigenvalue vectors among the obtained plurality of eigenvalue vectors;
estimating a noise sub-space based on the q smallest eigenvalue vectors; and
estimating the incident direction(s) of NLOS interference signal(s) corresponding to the p largest eigenvalue vectors, based on the estimated noise sub-space.

10. The first communication node according to claim 8, wherein each of the plurality of array antenna combinations is configured to include K antenna elements randomly selected from among the plurality of antenna elements, K being a natural number greater than 1.

11. The first communication node according to claim 8, wherein each of the plurality of array antenna combinations commonly includes a first reference antenna element selected from among the plurality of antenna elements and includes (K−1) antenna element(s) randomly selected from among remaining antenna elements excluding the first antenna element from the plurality of antenna elements, K being a natural number greater than 1.

12. The first communication node according to claim 8, wherein in the performing of the spatial filtering, the processor further causes the first communication node to perform:
determining a plurality of spatial filters respectively corresponding to the plurality of array antenna combinations, based on the estimated incident direction(s) of the one or more interference signals; and
performing the spatial filtering based on the plurality of spatial filters on signals received through the plurality of array antenna combinations, respectively,
wherein the plurality of spatial filters are configured to perform filtering in different schemes for the incident direction(s) of NLOS interference signal(s) and incident direction(s) of LOS interference signal(s) corresponding to the LOS condition.

* * * * *